Nov. 1, 1966     A. H. A. TILLOY     3,282,528
WINDER FOR SMALL CABLE

Filed July 20, 1964     3 Sheets-Sheet 1

Inventor
A. H. A. TILLOY
By Holcombe, Wetherill + Brisebois
Attorneys

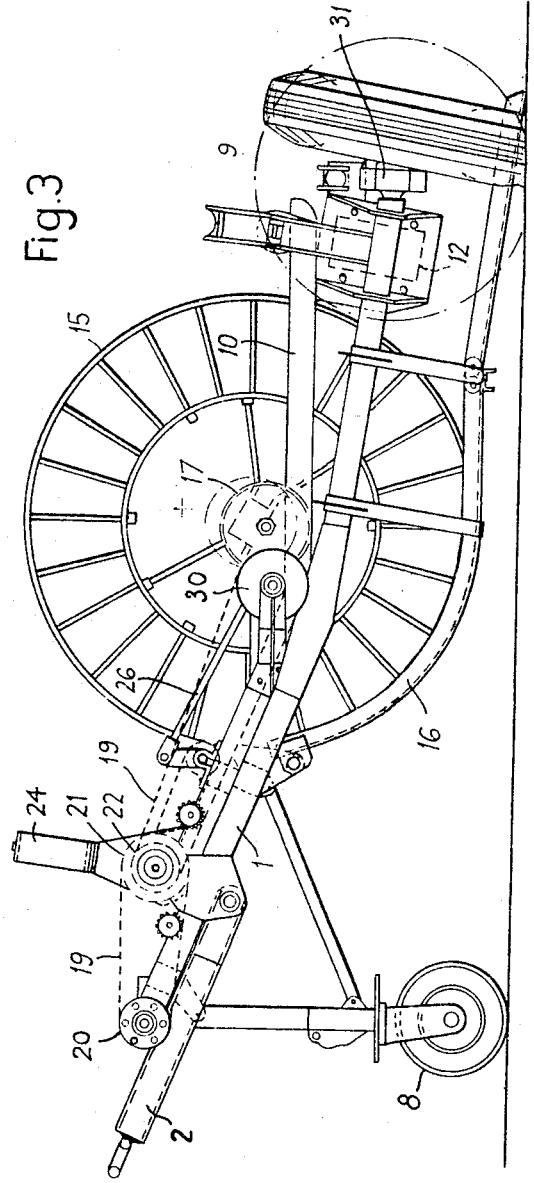

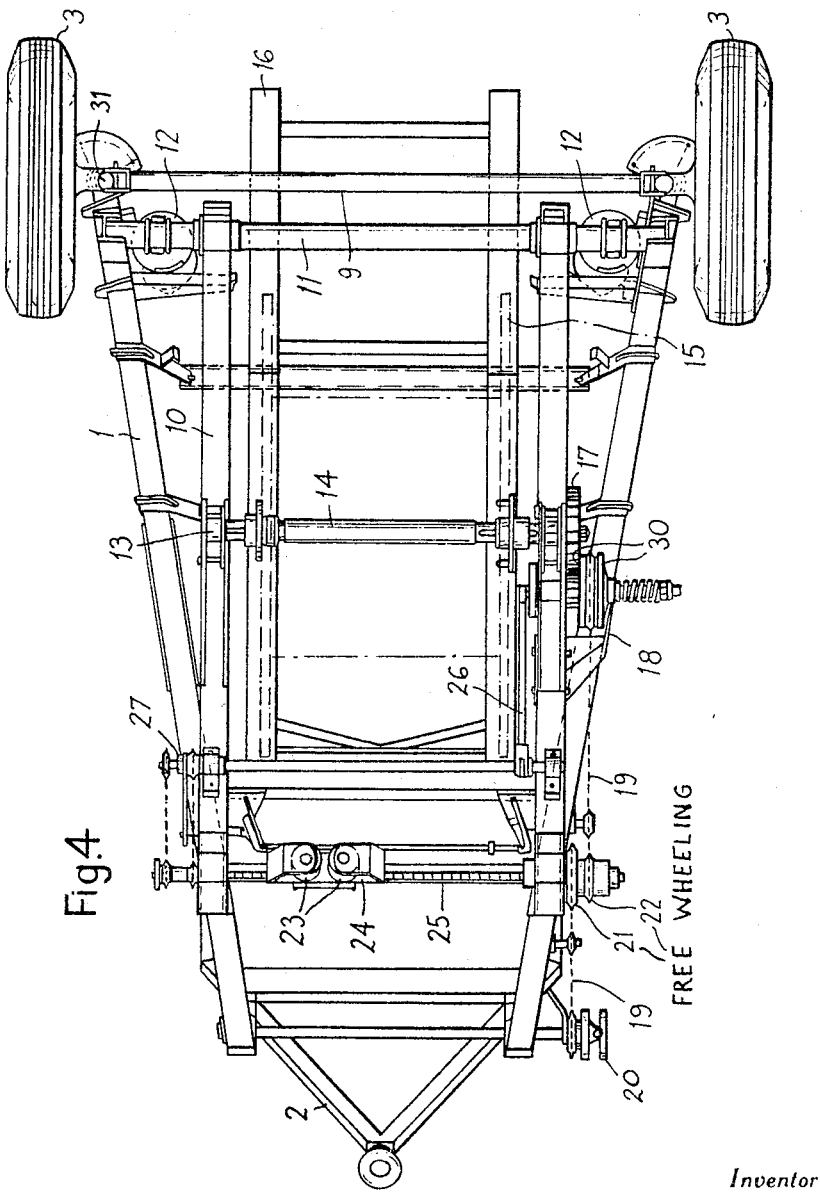

United States Patent Office 3,282,528
Patented Nov. 1, 1966

3,282,528
WINDER FOR SMALL CABLE
André Henri Antóine Tilloy, Versailles, France, assignor to Societe Generale d'Entreprises, Colombes, Seine, France, a French body corporate
Filed July 20, 1964, Ser. No. 383,883
Claims priority, application France, July 19, 1963, 942,127
2 Claims. (Cl. 242—86.5)

The invention relates to a device for the winding of very long small cables used in gantries which have to effect long distance traction at a series of fixed successive locations, for example in order to pull on a towing cable to be extended between two line blocks. The small cable is attached to the end of the towing cable and passes into a traction engine comprising a winch, which does not however store this small cable which leaves it loose. An ordinary winding drum does not allow small cables to be pulled and coiled with a strong tension, hence the need of using a double-drum traction engine which allows the tension of the cable to be reduced without however storing it. The winding apparatus forming the subject of the present invention has as its object to allow this small cable to be received on a reel when leaving the winch of the traction engine, said reel being constructed in such a manner as to be able easily to be used on gantries together with a traction engine mounted upon a vehicle which moves therewith.

According to one of the features of the invention, the cable winder is constructed in the form of a trailer which may either be hitched behind and towed by a tractor, or may be attachd to the side of the tractor when it stops in position for winding the cable drawn by the winch carried by the vehicle.

In this latter position, the winding mechanism is preferably connected to a transmission mechanism of the towing vehicle so that it is actuated automatically and synchronously with the winch.

The winder may be a semi-trailer carried at its rear end by wheels which may be located in two perpendicular positions, either parallel, in order to allow the trailer to be towed, or in alignment and parallel to those of the tractor in operational position thus making possible a slight displacement, in the event of the tractor moving backwards under the force of traction, without damaging the winder.

The winding mechanism connected to a transmission of the towing vehicle may comprise a transmission which transmits to the reel a circumferential speed which is slightly greater than that of the linear speed of the cable wound off the winch, in order to ensure a winding with a slight tension, the difference in the speed being absorbed by friction couplings inserted in the transmission mechanism.

In order that the invention may be more clearly understood, an embodiment thereof will now be described with reference to the accompanying drawings, in which:

FIGURE 3 is a side elevation of the winding device in winding position;

Figure 1:
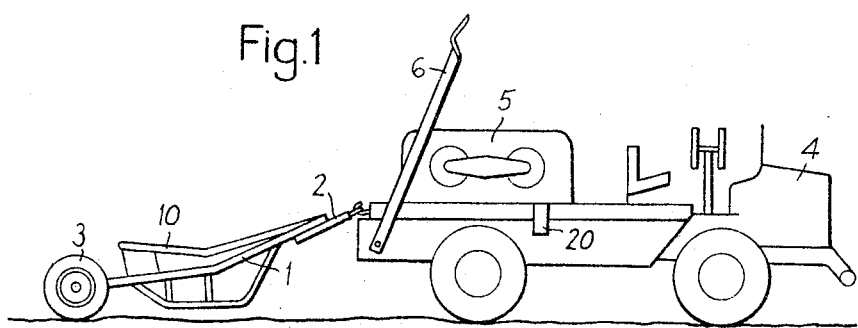
FIGURES 1 and 2 are diagrammatic side elevations of the winding device in towing position and in winding positions with respect to a towing vehicle.

And FIGURE 4 is a plan view of FIGURE 3.

The cable winding device is in the form of a semi-trailer comprising a fixed chassis 1, the front of which terminates in a tow bar 2, and being carried at the back by two wheels 3. In towing position (FIGURE 1), the tow bar is hooked to the rear of the towing vehicle 4, the platform of which carries the traction winch 5. The wheels 3 are located parallel to one another, as is also shown in FIGURE 4. In winding position (FIGURE 2), the device is attached to the right hand side of the towing vehicle which is then secured to the ground by means of a removable spade 6 in order to resist the traction exerted on the cable 7 by the winch 5. In this case, the wheels 3 of the winder are turned by 90° and aligned in a plane parallel to the wheels of the towing vehicle. This latter position of the wheels allows the winder to follow the traction engine without damage when the latter is drawn by a strong tension of the cable and rebounds slightly while still being secured.

The front of the fixed chassis carries a third wheel 8 on a jack which may be adjusted as to direction and which may be drawn up in order to facilitate manoeuvring to bring the chassis into position.

The fixed chassis 1 comprises two bars arranged to form an isosceles trapezium and connected towards the small base by cross bars, and carrying at this end the movable tow bar 2. The wheels 3 are mounted on the rear end of the bars on pivots 31 articulated about a vertical axis and which may be locked into the two positions of the wheels. The large base of the trapezium, forming the back of the winder, comprises a movable cross bar 9.

The fixed chassis 1 carries a movable chassis 10 formed by two parellel long bars connected at the front end by cross bars and articulated to the fixed chassis. The back is formed by a movable cross bar 11. The ends of said cross bar 11 extend beyond the long bars at either side and are able to receive the thrust of the two pneumatic jacks 12 carried by the fixed chassis and acting to raise the rear of the movable chassis 10. The two jacks may be supplied with air by a conduit connected by means of a rapid connection to the compressed air unit of the vehicle.

The two long bars of the movable chassis 10 carry two bearings 13 which are able to open in order to receive the shaft 14 of a reel 15 serving to receive the cable 7, and then are able to be locked by a rapid manual movement. The reel on which the cable will be coiled is able to pass between the two wheels 3 of the winder in operational position when the rear cross bars 9 and 11 of the two chassis are raised, and is coiled on the support 16 secured to the fixed chassis 10 which positions it in such a manner that the spans of its shaft are plumb with the open bearing and are raised by said bearings under the action of the jacks when the cross bar 11 is replaced in position.

This reel shaft 14 carries a toothed wheel 17 which engages on a pinion 18 carried by the movable chassis, and which receives its movement from the shaft of the traction engine in direct relation to the movement and speed of the winch.

The winder in operational position is hooked by means of its front end to two supports on the side of the traction engine, and its mechanism may be secured to that of the winch 5 by means of a side dog-clutch transmission 20 having a universal joint carried by the winch chassis.

The movement is transmitted by the transmission 20 to the reel by means of a chain and pinion transmission 19 which is so constructed that the linear speed of the drum of the reel 15 is very slightly greater than that of the cable recovered at the outlet of the necks of the winch 5. This difference in speed is absorbed by the friction plates of a frictional coupling 30 inserted in the transmission in front of the pinion 18 which actuates the toothed wheel 17 of the reel. This arrangement maintains, on the output strand of the winch, a certain tension which is necessary in order to ensure the adhesion of the cable in the pulley of the winch. Furthermore, friction also absorbs the difference in speed which would be caused by the increase in the diameter of winding of the cable on the reel by the superimposition of the layers.

However, when operations require that the winch 5 operates so as to reverse and discharge the cable 7 instead of drawing it up, friction will be harmful in that the reel 15 would then release more of the cable than the winch could absorb. Slack would then be produced in the cable between the reel and the winch and this would increase and the cable would escape from the grooves of the winch and might cause serious accidents.

This disadvantage is avoided by inserting in the transmission two return pinions 21 and 22 mounted as free wheels in the articulated shaft of the movable chassis 10, the operation of which pinions is as follows:

(1) In normal operation, the free wheel of the control pinion 21 drives the controlled pinion 22 and the free wheel of the latter allows it to turn freely with respect to a fixed drum. The controlled pinion 22 then drives the pinion of the frictional coupling 30 and consequently the frictional coupling drives the reel.

(2) In reverse operation, the free wheel of the control pinion 21 no longer drives the controlled pinion 22 and this control pinion is able to rotate in the reverse direction. The controlled pinion 22 is then driven in a reverse direction by the rotation of the spool which is drawn by the cable but is locked by its free wheel in the fixed drum. The friction plate is thus blocked and in order to rotate the capstan must then overcome the braking friction. The reversing winch must thus exert a tension on the cable of the braked reel, and the cable which is thus held tensioned is not able to escape from the winch.

The regular winding of the cable 7 on to the reel 15 is ensured by two roller guides 23 carried by a carriage 24 which is driven in a transverse direction by a screw 25, the rotation of said screw being itself controlled by a crank system 26 which receives its movement from the pinion 18 which actuates the spool below the friction. At each end of travel an automatic dog-clutch 27 controlled by the carriage bearing changes the direction of movement of the screw and of the carriage. The pitch of winding of the cable of the reel may be regulated by the length of an adjustable handle (crank) depending upon the diameter of the cable used.

*Operation*

When the towing vehicle 4 moves to its operational location it tows by its rear hook the winder, the two rear wheels 3 of which are parallel, the operational wheel 8 and the support 16 being raised (FIGURE 1).

Figure 2:
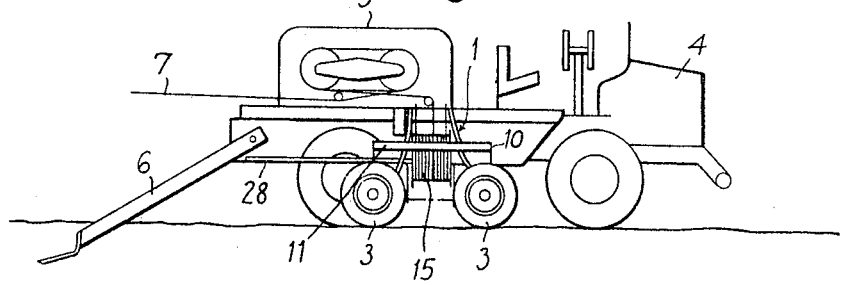

When it arrives at its destination the additional wheel 8 is lowered, the operation of the jack raises the hitching ring and the vehicle 4 thus released takes up drawing position on the stays. The winder is then hitched to the side of the tractor 4, its rear wheels 3 are turned by an angle of 90° and are locked parallel to those of the tractor, the manoeuvring wheel 8 is raised and the rear of the winder is connected to that of the tractor by means of a counter brace 28 (FIGURE 2).

The removable rear cross bars 9 of the fixed chassis 1 and the removable cross bar 11 of the movable chassis 10 are then raised.

The support 16 is then hooked in its low position and the bearings 13 of the movable chassis 10 are opened. An empty reel is then mounted on the support, the driving shaft is inserted into its centre and held at the outlet by the movable plate. The two rear movable cross bars 9, 11 are replaced in position.

The rapid connection of the flexible tubing of the winder is adapted to the corresponding connection of the tractor. By operating the tap, the jacks 12 raised by means of the rear cross bar 11 the movable chassis 10 which in turn raises the reel 15. Two cross supports are held down by hand while the closing of the tap empties the jacks and the movable chassis comes to rest upon its support by means of the rear cross bar 11, the shaft 14 of the spool resting upon bearings 13 which lock it.

When the driving dog-clutch 20 is locked, the cable passed and secured on the reel and the carriage guide 24 placed in position to commence travel, the whole of the cable may be wound without any manual intervention, the initial adjustments having been of course effected once and for all. If it is necessary to reverse direction because an obstacle is met with, this may be effected without undue buckling of the cable and without any other intervention than that of the winch groove.

When the whole cable 7 has been coiled and released and the movement is stopped, the two bearings 13 of the shaft 14 of the reel are unlocked and opened. When air is admitted to the jacks 12 they come to the end of their travel in order to raise the raising cross bar 11 from its support which thus freed are removed by springs. Since the air is immediately cut off the jacks are evacuated, the reel comes to rest upon the support 16 and the movable chassis 10 continues to be lowered, and its bearings release the reel shaft.

By raising the two rear cross bars 9, 11, the full spool may then be replaced by an empty spool into which the shaft 14 is again inserted. After replacing the cross bars and operating the jack support and bearings, the winder is ready for a new cable, the reel being replaced in a minimum time with minimum effort.

When pulling is terminated the winder is released from its dog-clutch and raised upon its movable wheel, the air connection is cut off and the trailer hitched up again for towing.

The invention is of course not limited to the specific embodiments hereinbefore described, on the basis of which variants may be conceived.

I claim:

1. A cable winder in the form of a trailer comprising a fixed chassis having a tow-bar at the front and two trailer wheels at the rear of said chassis, a movable chassis to support a cable reel, said movable chassis being articulated along a transverse axis at the front on to the rigid chassis and supported at the rear by jacks enabling the movable chassis to be raised or lowered relative to said fixed chassis, a winding mechanism comprising a transmission clutch, a transmission including a frictional coupling to drive said cable reel, said trailer wheels being attached to the rear of said fixed chassis by vertical pivots associated with locking means enabling the trailer wheels to be placed parallel or perpendicular to the longitudinal axis of said chassis, both said fixed chassis and said movable chassis comprising at the rear a rigid cross-bar.

2. A cable winder in the form of a trailer comprising a fixed chassis having a tow-bar at the front and two trailer wheels at the rear of said chassis, a movable chassis to support a cable reel, said movable chassis being articulated along a transverse axis at the front on to the rigid chassis and supported at the rear by jacks enabling the movable chassis to be raised or lowered relative to said fixed chassis, a winding mechanism comprising a transmission clutch, a transmission including a frictional coupling to drive said cable reel, and two intermediate reverse gears located between said clutch and said frictional coupling, said gears being mounted respectively as free wheels of inverse sense.

References Cited by the Examiner

UNITED STATES PATENTS

| | | | |
|---|---|---|---|
| 1,138,940 | 5/1915 | Dooley | 242—82.62 |
| 2,467,869 | 4/1949 | Spillman | 242—86.61 |
| 2,704,191 | 3/1955 | Schley et al. | 242—86.8 |
| 2,913,194 | 11/1959 | Garnett | 242—86.5 |

FRANK J. COHEN, *Primary Examiner.*

MERVIN STEIN, *Examiner.*

N. L. MINTZ, *Assistant Examiner.*